June 10, 1930. F. M. GATES 1,763,509
EXPOSURE METER
Filed May 4, 1929 2 Sheets-Sheet 1

Frank M. Gates,
INVENTOR
BY Victor J. Evans
ATTORNEY

June 10, 1930.                    F. M. GATES                    1,763,509
                                EXPOSURE METER
                            Filed May 4, 1929           2 Sheets-Sheet 2
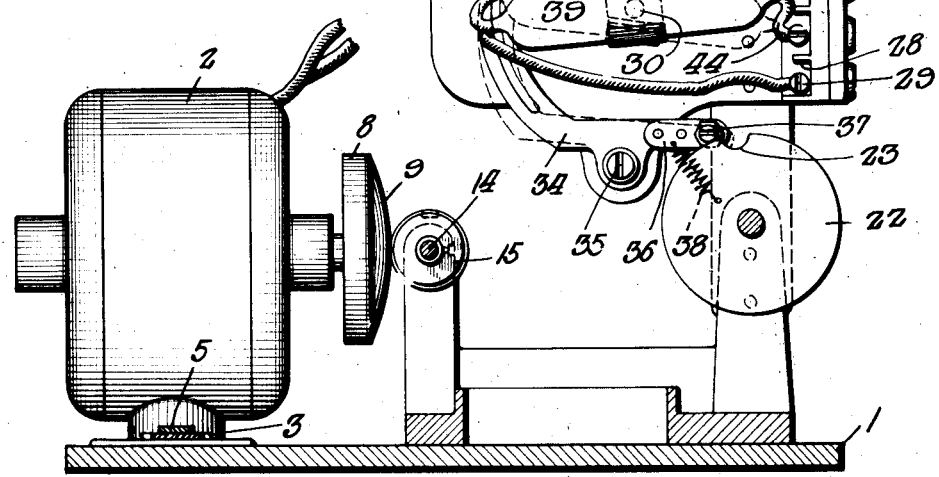
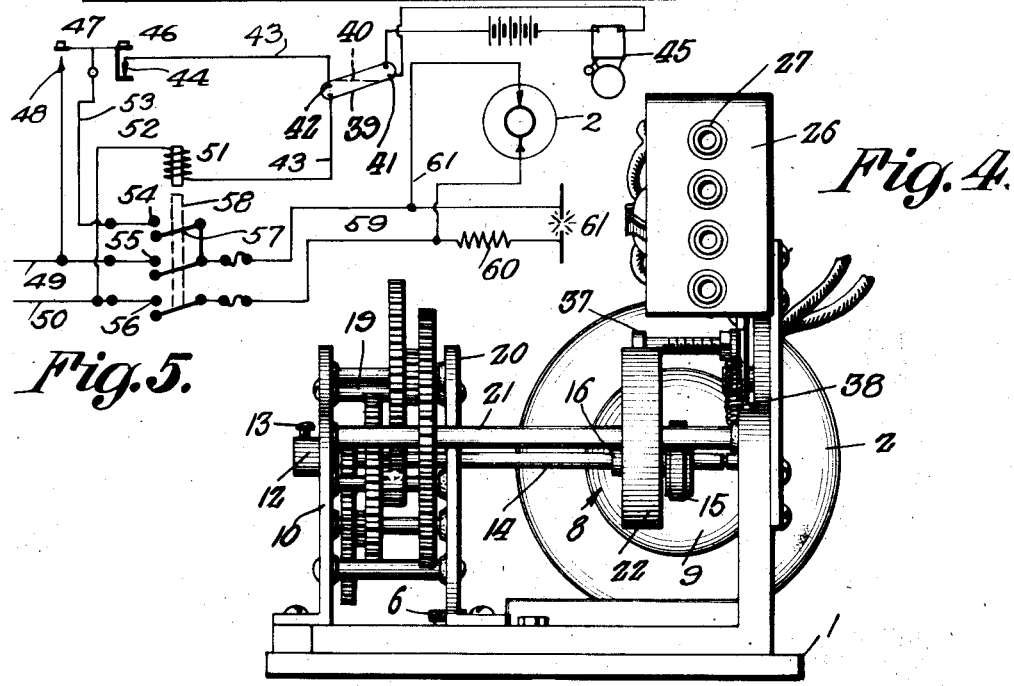
Frank M. Gates,
INVENTOR
BY Victor J. Evans
ATTORNEY Patented June 10, 1930

1,763,509

UNITED STATES PATENT OFFICE

FRANK M. GATES, OF ROCKFORD, ILLINOIS, ASSIGNOR OF ONE-THIRD TO WALTER P. KELLEY, OF ROCKFORD, ILLINOIS

EXPOSURE METER

Application filed May 4, 1929. Serial No. 360,558.

The object of this, my present invention is the provision of a variable timing meter designed for use in connection with photographing, photographic transferring, blueprinting, or the exposing of any sensitised plate, film, metal or combination of metals or paper by artificial light and in which the quantity of light allowed for each exposure is automatically controlled.

A further object is the provision of a switch for this purpose which shall be strong and compact, which contains few parts that are liable to breakage or disorder and which, except for the setting, is entirely automatic in action.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 3 is a side elevation with parts broken away and parts in section.

Figure 4 is an end view.

Figure 5 is a diagrammatic view to illustrate the electric wiring.

Figure 1:
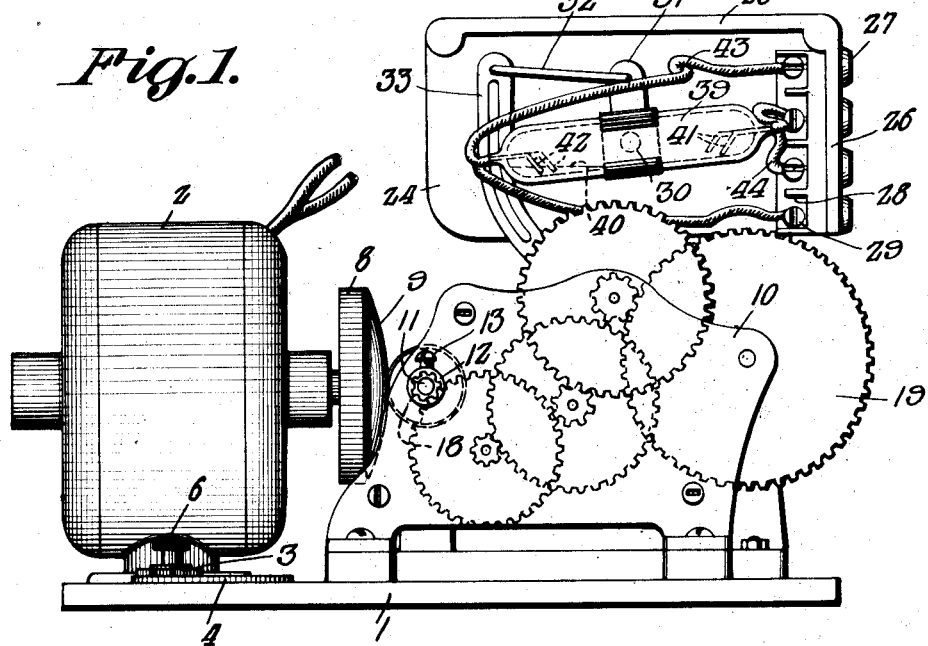
Figure 1 is a side elevation of the improvement.
Figure 2:
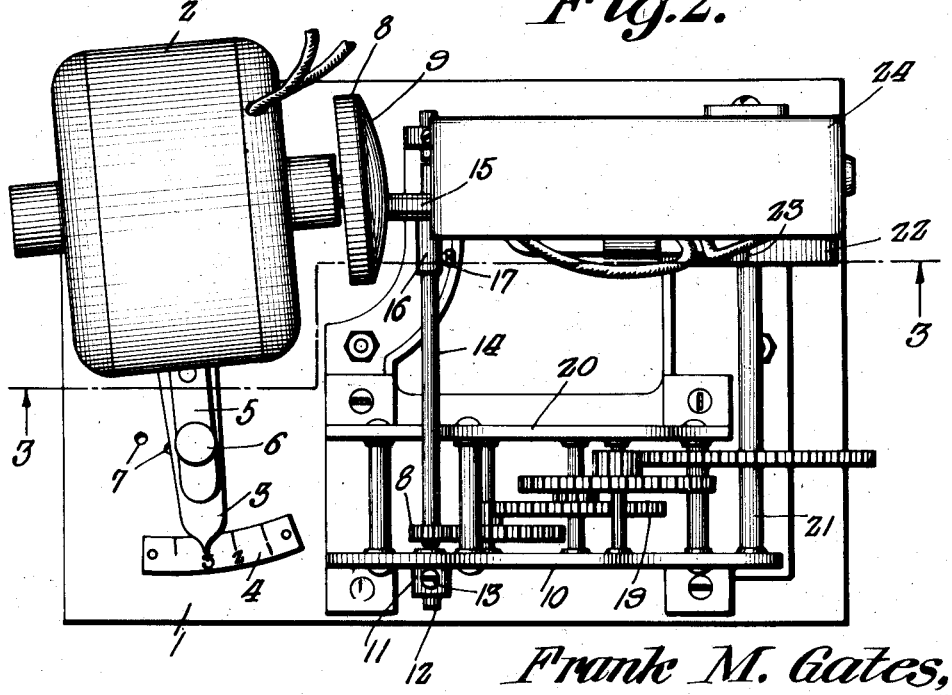
Figure 2 is a top plan view thereof.

The photographic transfer press is set to expose a series of say twelve exposures on a sheet of zinc and a magnetic switch with push button control is used for a line switch in carrying out my invention. I have not deemed it necessary to illustrate the transfer press.

As disclosed by the drawings my improvement is mounted on a base 1. On the base there is pivotally fixed the bottom of an electrically driven motor 2. On the bottom of the motor 2 there is a laterally extending finger in the nature of a pointer 3 that is movable over a timing scale 4 which is fixed on the base. The scale 4 is inscribed to indicate minutes and fractions thereof. The pointer 3 has fixed thereon one end of a spring 5, the said spring having fixed thereto a stud provided with a head 6, and the said stud is designed to be received in one of a number of apertures 7 which correspond to the indicating marks on the scale plate 4.

The shaft of the motor has fixed on one end thereof a wheel 8 whose outer face is convexed, as at 9. The wiring for the motor is best illustrated by the diagram in Figure 5 of the drawings and will hereinafter be described.

On the base 1 there is fixed an upstanding frame which is broadly indicated by the numeral 10. The outer sides or upstanding flanges of the frame 10, adjacent to the end thereof nearest the motor are provided with sockets 11 for movable bearings 12, the said bearings being held adjusted in the sockets by binding means 13. The bearings receive therein the reduced ends of a shaft 14. On the shaft 14 there is a friction wheel 15 whose hub portion 16, through which the shaft passes, is provided with a binding element 17 and whereby the friction wheel 15 may be properly adjusted on the shaft. The friction wheel 15 is designed for contacting engagement with the convex face 9 of the friction wheel 8.

The shaft 14 has also fixed thereon a pinion 18, and this pinion is in mesh with one of a train of reducing gears and pinions which are broadly indicated by the numeral 19, and whose shafts are journaled between one of the upstanding side members and an inner upstanding member 20 on the frame 10. The outer or end shaft of the train of gears is indicated for distinction by the numeral 21.

The shaft 21 is arranged outwardly or beyond the frame portion 20 and finds a bearing in the second end flange of the said frame 10. There is fixed on the shaft 21 a fibre disc wheel 22 which has a peripheral notch 23.

Fixedly supported on the frame, at the side thereof opposite that provided with the reducing gears 19 there is a metal plate 24 that is provided with an inwardly directed top flange 25 and an inwardly directed outer end flange 26. The end flange 26 is provided with openings through which pass hollow insulator heads or buttons 27, respectively, there being four of such insulators disclosed by the drawings and the same are arranged one directly above the other. On the plate 24 directly opposite and in contact with the flange 26 there is a terminal block 28, and to this block there is secured four spaced binding posts, preferably in the nature of headed screws 29, respectively.

The numeral 30 designates a rounded body portion of the bracket which has its inner face pivoted to the plate 24. The bracket is provided with an upstanding arm 31, and this arm is connected by a link 32 to the end of the arched and slotted portion 33 of a swingable arm or lever 34. The straight lower end of the lever is provided with a depending ear which is pivoted, as at 35, to a depending ear carried by the plate 24. The end of the arm 34 has fixed thereto but offset therefrom an extension which I will term a finger and which is designated by the numeral 36. The finger carries on its outer end a lateral extension which may be in the nature of a screw or roller 37 that is arranged over the periphery of the fibre wheel 22 and that is influenced into contact with the said wheel by a coil spring 38 that is fixed to the finger and also fixed to the frame 10 or to the portion of the plate 24 that is secured to said frame.

The plate 30 has centrally received therethrough and fixed therein the glass bulb 39 of a mercury switch, the said tube containing a small quantity of mercury 40. The ends of the tube 39 are closed but receive therein spaced pairs of contacts 41—41 and 42—42. The contacts 42 are wired to two of the binding posts 29, the said wires being suitably encased and indicated by the numerals 43, respectively. The contacts 41 are wired, as at 44, to the remaining binding posts 29. These last mentioned binding posts are also connected to circuit wires for an alarm 45, as indicated by the diagram in Figure 5.

As disclosed in the diagram in Figure 5 the wires 43 are in circuit with the battery and in this circuit there is an alarm bell 45. One of the wires 43 leads to a contact 44 which is normally engaged by a push button 46. Connected with the push button 46 there is a second push button 47 which is normally out of engagement with a contact 48 of a branch wire that leads to one of the main wires 49. The second line wire is indicated by the numeral 50. The second wire 43 from the mercury switch is connected to a magnet switch retaining coil 51, and leading from this coil there is a wire 52 that is connected to the line wire 50. From the starting switch 47 and the stop switch 46 there is a wire 53 that leads to a contact 54. Each of the line wires 49 and 50 terminates in a contact 55 and 56, respectively, and these contacts are engageable by switch elements each indicated by the numeral 57 which are connected to a metal post 58 that is designed to be attracted by the core of the switch retaining coil 51 when the push button 47 is brought against the contact 48. When the coil 51 is deenergized, the post 58 will gravitate therefrom and move the switch elements 57 away from the contacts 54, 55 and 56. The switches 57, which are designed to engage with the contacts 55 and 56 of the line wires have connected therewith wires 59, one of which having arranged therein an arc resistance 60 and both of which are wired to an arc lamp 61. The motor 2 of the timer has an auxiliary circuit whose wires are connected with respective wires 59 that lead from the magnetic switches 57.

It will thus be seen that when the starting switch 47 is brought to engage with the contact 48 the current from the line wire will be directed to the motor and arc lamp as well as to the contacts 42 in the mercury switch.

Supposing the time desired for exposures is three minutes, in which instance the motor is turned to bring the pointer opposite the numeral 3 on the timing scale 4 and the spring influenced element latches the motor in such position. This brings the convex friction wheel 8 to proper position with respect to the friction wheel 15 on the shaft 14. The push button 47 is then moved to engage with the contact 48 so as to close the magnetic line switches 57 and both start the motor and illuminate the arc lamp. The motor transmits motion to the train of gears 19 and to the notched fibre wheel 22. When the notch 23 in the wheel 22 is brought to a position to receive the pin or like element 37 therein, the arm 34 will be swung on its pivot 35 to cause the link 32 to tilt the mercury switch so that the mercury will flow away from the contacts 42 and bridge the contacts 41 in the second end of the mercury switch. This closes the circuit to the alarm 45 and causes the said alarm to be sounded. The motor, however, will continue to rotate for a short period of time due to momentum until the train of gears turn the fibre disc wheel 22 to again bring the offset element 37 of the arm 34 out of the notch 23. By this time the motor 2 will have come to rest and the instrument is now set for the next exposure. Any one of twelve exposures may vary as much as 25 seconds from each other but the density of each will be the same because the intensity of the arc controls the speed of the motor which in turn controls the time it takes for the wheel 22 to turn a complete revolution and thus shut off the exposure. This is quantity control.

Now if the motor were connected to a constant potential circuit, such as light circuits, the motor would have a constant speed and the wheel 22 will make one revolution in a definite and exact time. This is time control.

With my improvement it will be noted that two entirely different functions are obtained with the same instrument without any changes in the device itself, merely throwing a switch changing the motor from a constant potential circuit to a variable potential circuit.

With my improvement the quality of work is improved inasmuch as it insures uniform exposures. With the improvement the operator can do other work instead of waiting to stop exposures, thus increasing the operator's activities.

Having described the invention, I claim:

1. In a variable timing meter for the purpose set forth, a motor which is mounted for turning on a support, a friction wheel driven by the motor, means for latching the motor when turned to predetermined positions, a second friction wheel to be engaged by the motor friction wheel, a notched fibre disc turned by the friction wheels, a mercury switch having spaced contacts at the ends thereof which are wired respectively in a lamp circuit and in an alarm circuit, a pivoted support for the mercury switch, a pivoted arm loosely connected with the support and having an offset element to rest on the periphery of the disc and a spring for influencing the element against the disc.

2. An automatic variable timing meter for the purpose set forth, including a motor pivotally mounted on the support, a pointer carried by and extending from the motor, a scale over which the pointer is designed to travel, spring influenced latching means for holding the pointer when the motor has been rotated on its pivot to predetermined positions, a convex wheel driven by the motor, a frame, a shaft journaled thereon, a friction wheel carried by the shaft engageable with the convex wheel of the motor, a train of gears driven by the shaft, a second shaft turned by one of the gears, a peripherally notched fibre disc on said shaft, a bulb having closed ends and having a quantity of mercury therein, spaced contacts in the ends of the tube, and wired respectively to a lamp circuit and to an alarm circuit, a pivotally supported clip on the bulb, a pivotally supported arm, a link connection between the arm and clip, an offset element on the arm to rest on the periphery of the disc and a spring for influencing the element against the fibre disc.

3. In a variable timing meter for the purpose set forth, a pivotally mounted electrically operated motor, means for latching the motor when turned to determined positions, a peripherally notched fibre disc turned by the motor, reducing gears between the fibre disc and the motor, a mercury switch having spaced contacts at the ends thereof which are wired respectively in an electric arc lamp circuit and in an alarm circuit, a pivoted support for the mercury switch, a pivoted arm loosely connected with the support and having a spring influenced offset element pivoted thereto to rest on the periphery of the fibre disc, an auxiliary circuit wired to a main circuit and likewise wired to the mercury switch and to the alarm, push buttons for making or breaking the auxiliary circuit, a coil in the auxiliary circuit connected to the wire leading to the main circuit, said main circuit being connected to the motor and to the arc lamp, switches for normally opening the main circuit when the auxiliary circuit is energized and a metal post connected with the switches disposed opposite the coil and designed to be attracted thereto when one of the push buttons is operated and to gravitate away therefrom when the coil is de-energized In testimony whereof I affix my signature.

FRANK M. GATES.